United States Patent
Nalala Pochaiah (10) Patent No.: US 11,734,263 B2
(45) Date of Patent: Aug. 22, 2023

(54) GENERATING MODELS FOR USE IN MONITORING AN INDUSTRIAL PROCESS CONTROL SYSTEM

(71) Applicant: Schneider Electric Systems USA, Inc., Foxboro, MA (US)

(72) Inventor: Anil Kumar Nalala Pochaiah, Telangana (IN)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 65 days.

(21) Appl. No.: 17/538,399

(22) Filed: Nov. 30, 2021

(65) Prior Publication Data

US 2023/0169071 A1 Jun. 1, 2023

(51) Int. Cl.
G05B 23/02 (2006.01)
G06F 16/242 (2019.01)
G06F 16/2457 (2019.01)
G06V 30/19 (2022.01)

(52) U.S. Cl.
CPC ..... *G06F 16/2423* (2019.01); *G05B 23/0272* (2013.01); *G06F 16/24575* (2019.01); *G06V 30/19147* (2022.01)

(58) Field of Classification Search
CPC ........... G06F 16/2423; G06F 16/24575; G05B 23/0272; G06V 30/19147
See application file for complete search history.

(56) References Cited

U.S. PATENT DOCUMENTS

| | | | |
|---|---|---|---|
| 6,643,652 B2 * | 11/2003 | Helgeson | G06F 16/258 |
| 7,941,438 B2 * | 5/2011 | Molina-Moreno | G06F 8/35 |
| | | | 717/109 |
| 11,468,369 B1 * | 10/2022 | Wilson | G06F 18/21322 |
| 2005/0171746 A1 * | 8/2005 | Thalhammer-Reyero | |
| | | | G06F 30/20 |
| | | | 703/2 |
| 2012/0278353 A1 * | 11/2012 | Carrato | G06F 16/90 |
| | | | 707/769 |
| 2016/0321589 A1 * | 11/2016 | Powers | G06F 16/955 |
| 2019/0005395 A1 * | 1/2019 | Dutkowski | G06T 11/206 |
| 2019/0235482 A1 * | 8/2019 | Subramaniyan | G05B 13/048 |
| 2019/0278870 A1 * | 9/2019 | Novielli | G06N 20/00 |
| 2021/0089585 A1 * | 3/2021 | Callanta | G06N 20/00 |
| 2022/0108262 A1 * | 4/2022 | Celia | G06Q 10/063118 |
| 2022/0147934 A1 * | 5/2022 | Chandrashekar | G06F 40/30 |
| 2022/0269524 A1 * | 8/2022 | Burlik | H04L 63/20 |
| 2022/0366295 A1 * | 11/2022 | Lamba | G06N 20/00 |
| 2023/0078448 A1 * | 3/2023 | Celia | G06Q 10/06311 |
| 2023/0083724 A1 * | 3/2023 | Celia | G06F 16/2455 |

\* cited by examiner

*Primary Examiner* — Jorge A Casanova
(74) *Attorney, Agent, or Firm* — Stinson LLP (57) ABSTRACT

Monitoring an industrial process by building a training dataset of system data representative of status of industrial process parameters and training a custom query engine based on the training dataset. Models are generated using the custom query engine for matching query terms to the system data in response to user input representative of the system data that the user intends to access. Executing one of the models based on the input from the user generates an output retrieving the selected system data from the data tables for visualization.

21 Claims, 11 Drawing Sheets

GENERATING MODELS FOR USE IN MONITORING AN INDUSTRIAL PROCESS CONTROL SYSTEM

FIELD

The present disclosure generally relates to generating custom queries mapped with apps for industrial process control systems.

BACKGROUND

Users of known advisory software for industrial process control and safety systems must by competent in Structured Query Language (SQL) or have expert knowledge to prepare user-defined queries either through an "Advanced Query" tool or through an external SQL Query Browser. These users generally still reach out to R&D teams for improvement and validation of the queries. Users who are not SQL competent or expert must rely on R&D teams to assist with the production of new user-defined queries. Further, the time spent by the users to manually consolidate all the custom query results, export the data, and prepare analytics or reports for end-users can be significant.

SUMMARY

In one aspect, a computer-implemented method for monitoring an industrial process is disclosed. The method comprises first building a training dataset and generating domains from one or more sources of system data, which provide system data organized in a plurality of domains and representative of status of one or more domain parameters or categories of the industrial process. Next, the method comprises training a custom query engine based on the training dataset. Based on the training, the method then comprises generating one or more domain models using the trained custom query engine, the domain models matching query terms to the system data stored in the plurality of data tables associated with the industrial process. Next, the method comprises receiving, from a user, input representative of the system data that the user intends to access in the domains. The method then comprises executing at least one of the domain models based on the input from the user to generate one or more custom queries and executing the one or more custom queries on the data tables to access selected system data. Then the method comprises generating an output of the one or more custom queries, the output retrieving the selected system data from the data tables in response to executing the one or more custom queries. Finally, the method comprises generating a visualization of the output and retraining (or generalizing) the custom query engine based on contextual data relating to the selected system data retrieved from the data tables for a new context or input given by the user. The custom query engine evolves through minimizing feedback error and from the new data retrieved by the custom query engine. Moreover, a custom query engine based on artificial intelligence/machine learning also builds "domain" into the system by extracting the different sources of system data and, thus, eliminates the need or support of experts.

In another aspect, an industrial process control system is disclosed. The industrial monitoring process comprises one or more sources of system data, a database containing the system data in one or more data tables one or more processors, a memory configured to store one or more processor-executable instructions, and a display configured to accept input from a system user. The display can be an application or a bot. The sources further provide system data organized in a plurality of domains and representative of status of one or more domain parameters or categories of an industrial process and the processor-executable instructions further includes a machine learning custom query engine. The machine learning custom query engine, when executed by the one or more processors, is configured to perform various operations. These operations comprise: building a training dataset and generating the domains from the system data; training the custom query engine based on the training dataset; generating one or more domain models using the trained custom query engine, the models matching query terms to the system data stored in the data tables associated with the industrial process; receiving, from the system user, input representative of the system data that the system user intends to access in the domains; executing at least one of the domain models based on the input from the system user to generate one or more custom queries; executing the one or more custom queries on the data tables to access selected system data; generating an output of the one or more custom queries, the output retrieving the selected system data from the data tables in response to executing the one or more custom queries; and displaying a visualization of the output based on contextual information of the selected system data retrieved from the data tables.

In another aspect, a method of scoring domain model usage is disclosed. The method comprises building a training dataset from one or more sources of system data, the training dataset comprising one or more data tables storing the system data, which is organized in a plurality of domains and representative of status of one or more domain parameters or categories of an industrial process. The method comprises building the training set by compiling the system data and further managing the system data stored in the domains with the control system. The method then comprises training a custom query engine of an industrial process monitoring system based on the training dataset, wherein the custom query engine comprises a machine learning algorithm for auto-generating custom queries and contextual data. The method then comprises separating the system data in the data tables into the plurality of domains, wherein the domains are each a function of, for example, schema, data, context, usage, relevance, or other relevant attributes. The method comprises separating the system data in the data tables into the plurality of domains comprises generating one or more domain models using the system data received from the sources. The method then comprises generating a model for matching query terms to the system data in the data tables with the custom query engine and receiving, from a user, an input representative of the system data that the user intends to access in the domains, for generating a custom query. Next, the method comprises parsing, by the custom query engine, one or more keywords from the input data; identifying, by the custom query engine, one or more of the domains associated with the keywords; defining, by the custom query engine, the query terms corresponding to the one or more keywords; and executing the custom query on the identified one or more domains using the defined query terms. Finally, the method comprises outputting an output based on the executed custom query, the output retrieving selected system data from the data tables in response to the custom query, scoring the usage of the domains over time, and generating the associated contextual data and a dashboard for the given user input.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Industrial process control systems, such as advisory software, are based on execution of SQL transactions/queries or transactions/queries in another relational database management system (RDBMS) engine similar to SQL Server. As part of product media, advisory software shares "built-in" Queries and KPI templates for customer use cases to build upon. The major challenge for the customers is to have the competency to write MySQL queries to customize their specific needs and requirements. For this purpose, users (e.g., customers, Global Customer Support (GCS), and Delivery/Services teams) look to the R&D team for support on a continuous basis over the years. Even after receiving this custom support, users need to consolidate the "Knowledge/Information" from multiple interfaces of System Advisor to have a complete picture of their use cases. Advantageously, aspects of the present disclosure provide an "Out of Box" solution/concept utilizing frontend apps associated with custom query generated data that helps in both data informed and data driven analytics for analysis/assessment/predictions/recommendations, troubleshooting, reports, and forecasting, among other things.

Figure 1:
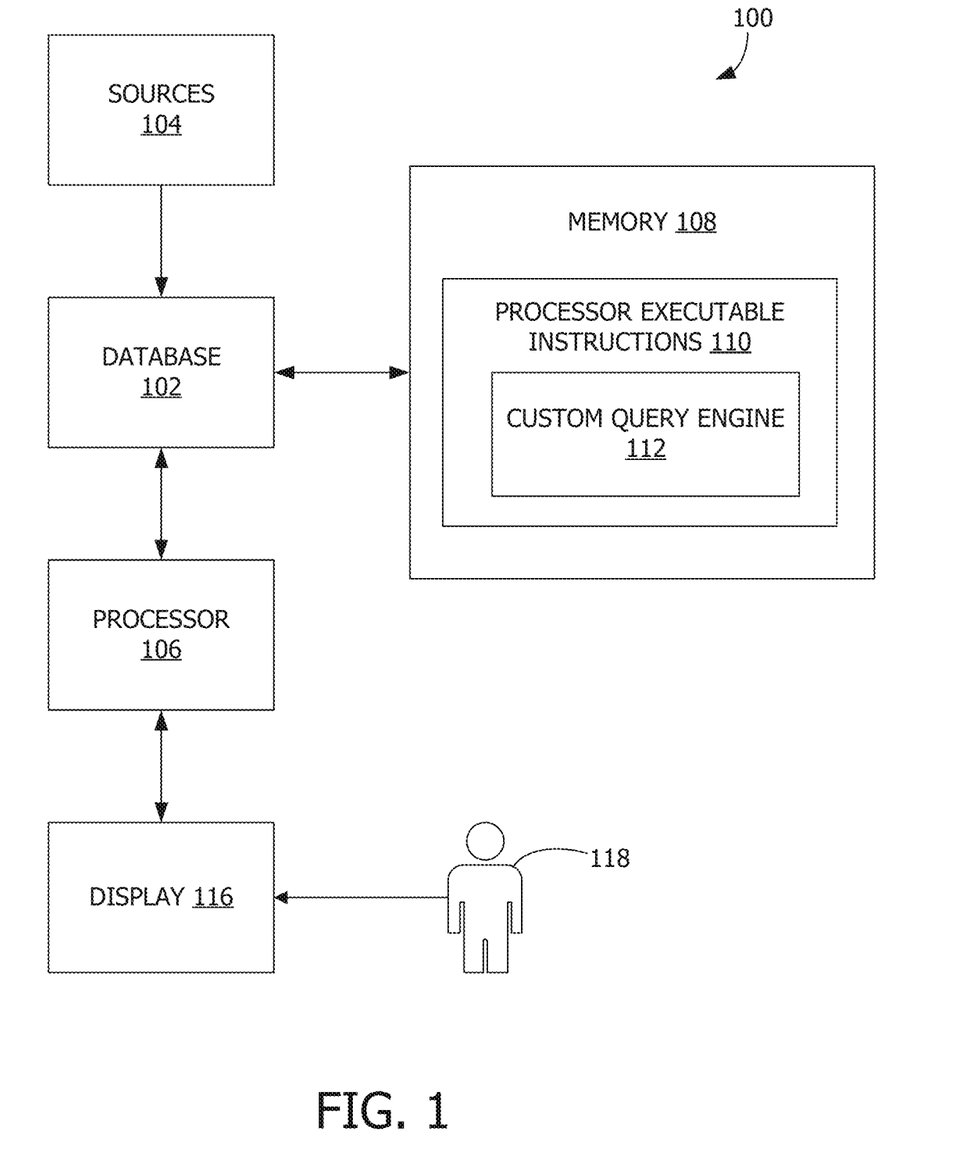
FIG. 1 is a schematic of an industrial process control system including a custom query engine.

Referring to FIG. 1, an industrial process control system is disclosed, as generally indicated by reference numeral 100. The industrial process control system 100 comprises a database 102, one or more sources 104 of system data, at least one processor 106, a memory 108, and a display 116. The sources 104 could be comprised of sensors, field equipment, or other system parameter measurement devices. The sources 104 can further include system configurations, engineering parameters, assets/inventory data, and historical or other relevant data from the entire control system employed in an industry or plant. The memory 108 is configured to store one more processor executable instructions 110, the processor-executable instructions further including a machine learning/artificial intelligence (ML/AI) custom query engine 112. The custom query engine 112 further comprises a (ML/AI) algorithm for auto-generating custom queries and contextual information, as described in further detail below. The display 116 (i.e., visualization software application and/or an interactive bot) is configured to accept input data from a user 118 that is representative of system data that the user intends to access from a set of data tables, as described in further detail below. The processor 106 is in communication with the display 116, the memory 108, and the database 102 in order to facilitate communication between the various components. In addition, the processor 106 is configured to execute custom query engine 112 such that the custom query engine performs specific operations, as will be discussed in further detail below. The database 102 is further configured to contain system data representative of parameters of the industrial process. The sources 104 are in communication with database 102, and are configured to transmit the system data to the database. In various embodiments of the current invention, the industrial parameters measured by sources 104 could comprise one or more of the following industrial automation control system data: key performance indicator templates, alarms, input/output, local variables, tag names, disabled points, hardware, library code, memory allocations, user privileges, audit management, timers, temperatures, molding parameters, work-in-process, inventory, backlog, through-put, cycle times, material properties, safety data, quality assurance, tracking data, customer data, or asset information, among other things.

Figure 5:
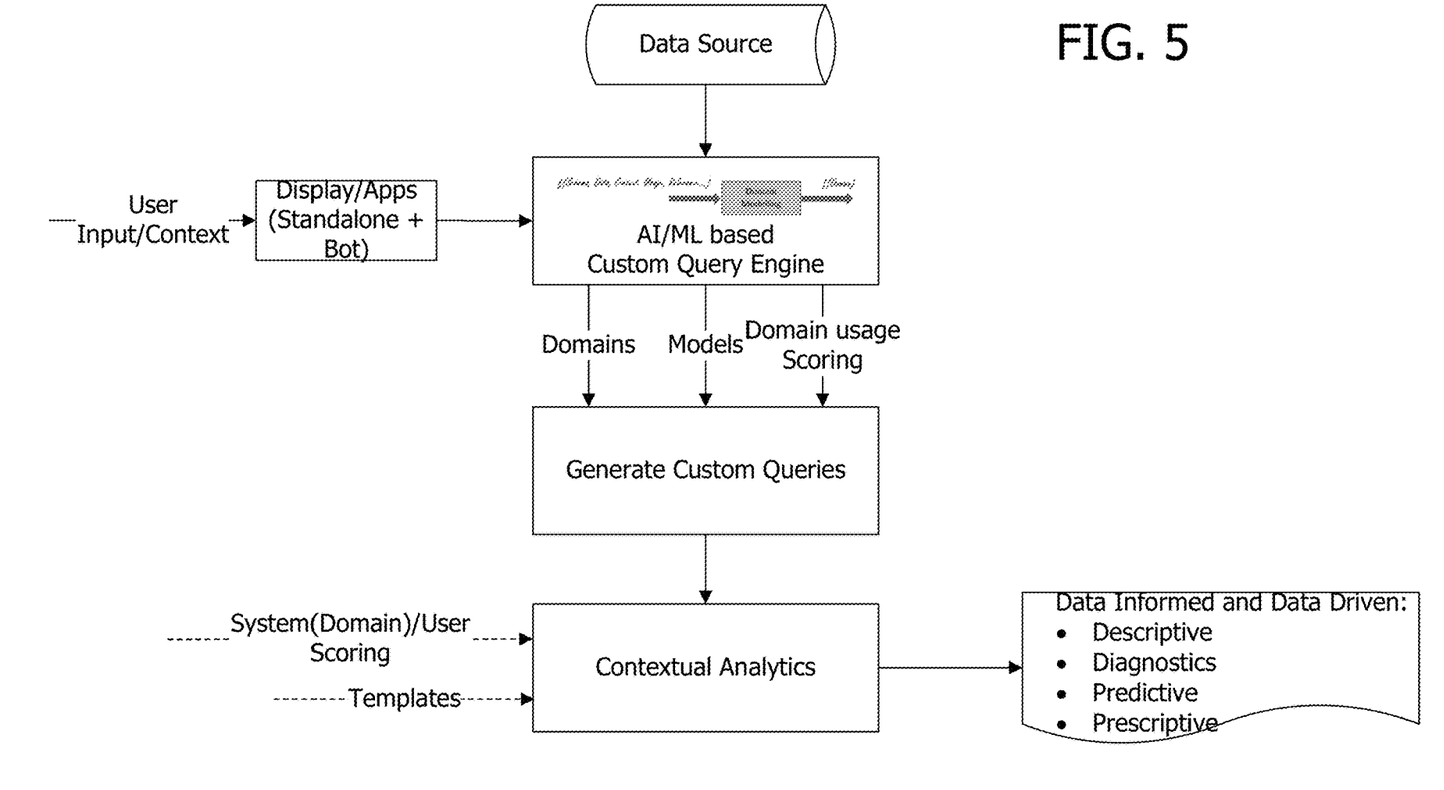
FIG. 5 is a high level schematic of domain scoring performed by the industrial process control system.
Figure 6:
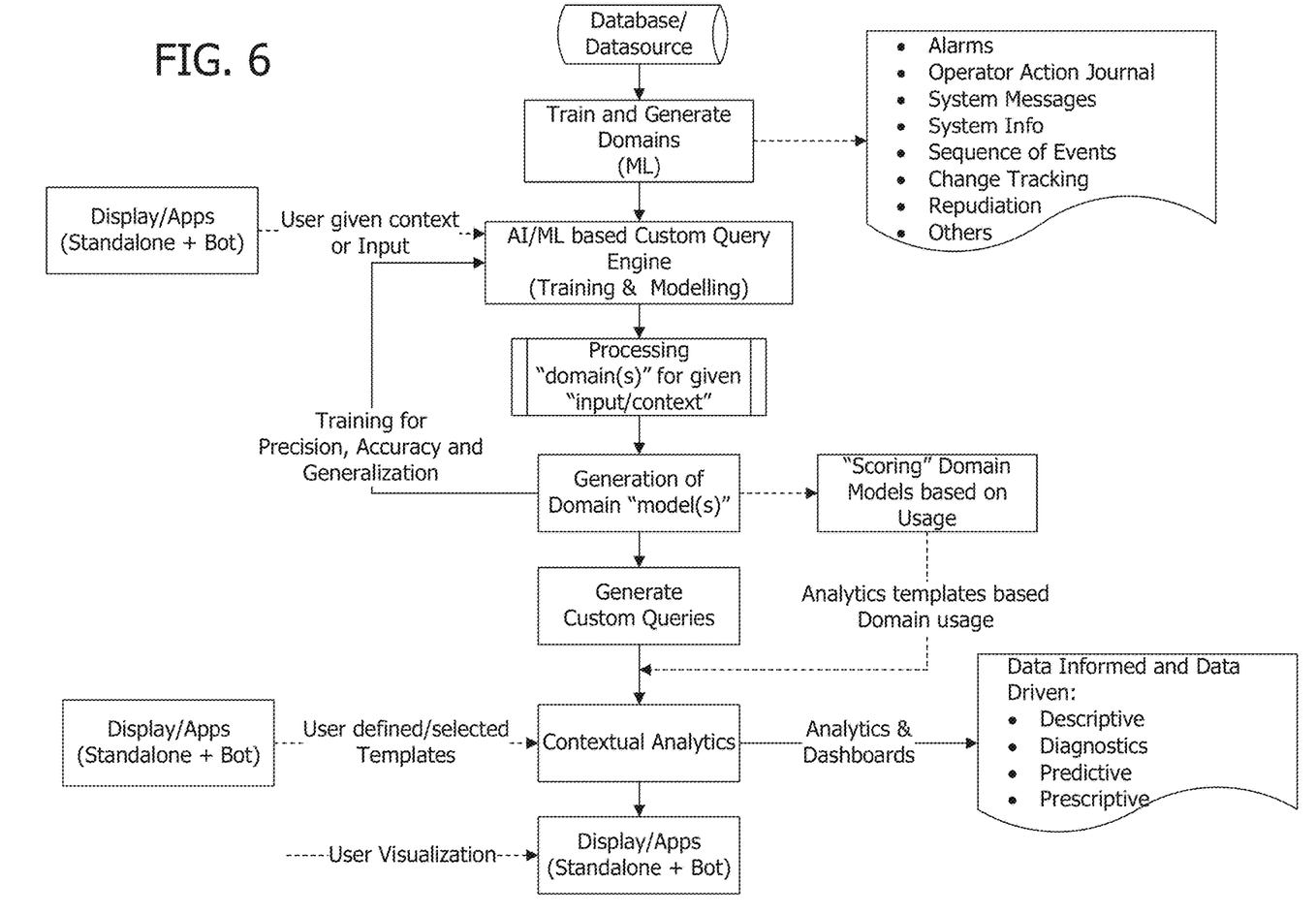
FIG. 6 is a flow diagram illustrating an example process for domain training and scoring.
Figure 7:
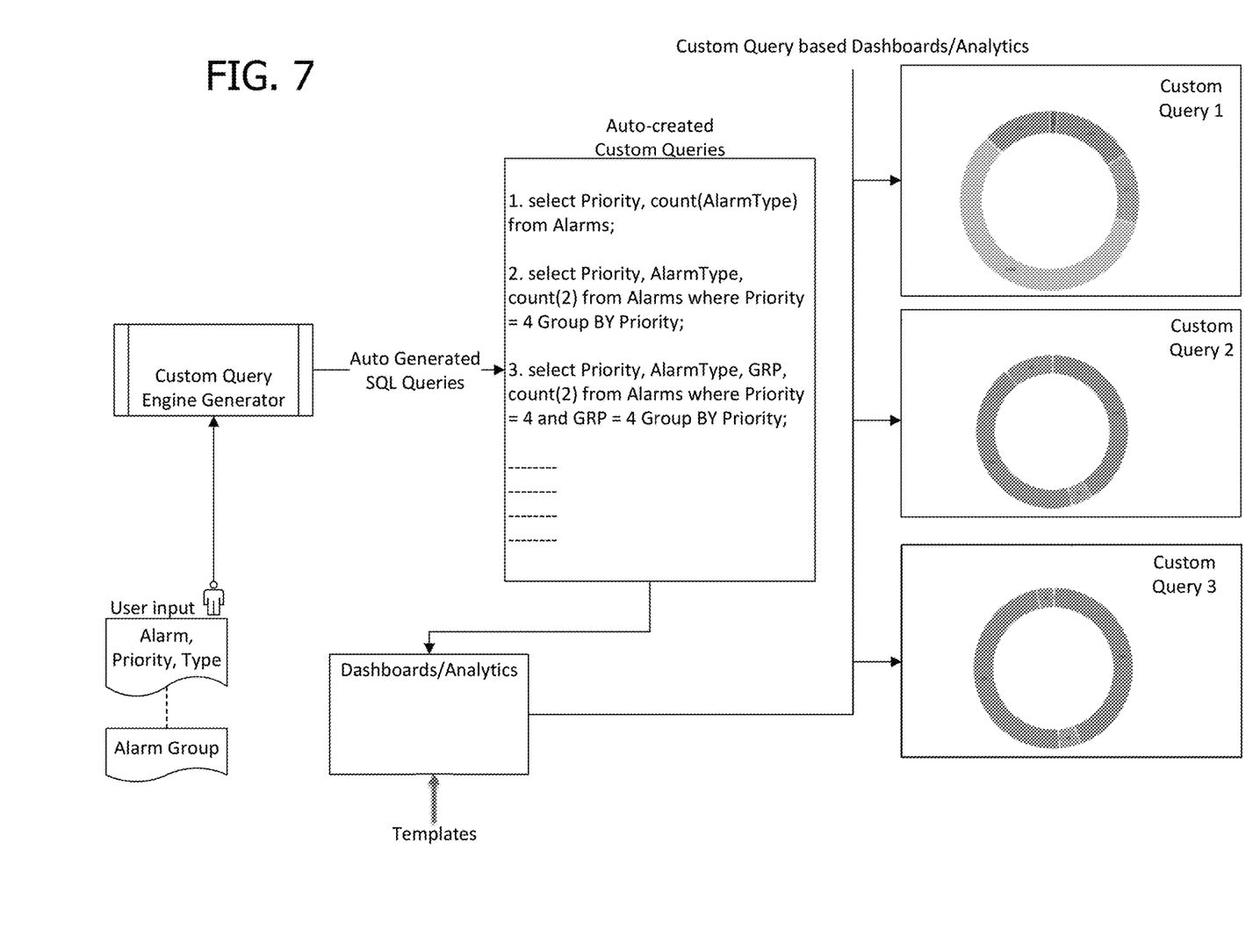
FIG. 7 is a schematic of custom query based dashboard and associated analytics for the given user context.

Once sources 104 have collected and transmitted the system data representative of these industrial parameters to database 102, the database builds the data into a training dataset. In an embodiment, the training dataset comprises a plurality of data tables storing the system data. In the illustrated embodiment of the present disclosure (FIGS. 8-11), the training set built comprises compiling alarm priority data. In other embodiments, the training set may be built from other sources similar to alarms such as Operator Action Journals (OAJ), Sequence of Events (SOE), Station Details, System Messages, Controller Data, Change Tracking and other sources. This training dataset is used to train custom query engine 112. As described above, the custom query engine receives input data representative of the system data that the user intends to access at display 116 in order to generate a custom query. The user input would be trained or retrained on the custom query engine based on the contextual information (e.g., analytics) to, for example, make the custom query engine more generalized. The custom query engine 112, using the training dataset, parses the input data for one or more keywords and identifies one or more tables associated with the keywords. The custom query engine 112 then defines the query terms to the keywords and executes the custom query on the identified one or more data tables using the defined query terms. Using processor 106, industrial process control system 100 manages the system data stored in the data tables in order to facilitated custom query engine 112 to generate a domain model for matching query terms to the system data within the data tables. In the illustrated embodiment, industrial process control system 100 comprises managing the alarm priority data stored in the data tables. The domain models are then used to further retrain the custom query engine 112 for precision, accuracy, and generalization. The custom query engine 112 further scores the domain models based on usage and integrates these scores into its contextual analytics templates. Once executed, an output is outputted by retrieving the selected data from the identified one or more data tables in response to the custom query. The output is delivered in a visualization to the user through a display 116. Based on the results, custom query engine 112 uses contextual analytics to analyze the system data, input data, processor executable instructions, output, and custom queries to determine a pattern of the user 118 and begins to auto-generate custom queries based off of the analytics for a new context or input given by the user. The custom query engine evolves through minimizing feedback error and from the new data retrieved by the custom query engine. Using system data received from sources 104, custom query engine 112 further generates one or more domain models (FIG. 5). The domain models are a function of, for example, schema, data, context, usage, relevance, or other relevant attributes. The custom query engine is also configured to score the usage of the various domain models to generate custom queries, and integrates these scores into its contextual analytics.

Referring to FIGS. 2-7, a computer-implemented method for generating custom queries and associated analytics and dashboards for a user given context or custom query will now be described. The method comprises a first step of transmitting system data from one or more sources 104 to the database and building a training dataset from the transmitted system data. The sources 104 could be comprised of sensors, field equipment, or other system parameter measurement devices. The sources 104 can further include system configurations, engineering parameters, assets/inventory data, and historical or other relevant data from the entire control system employed in an industry or plant. The training dataset comprising a plurality of data tables, the data tables storing system data representative of status of one or more domain parameters or categories of an industrial process. These parameters include, but are not limited to, key performance indicator templates, alarms, input/output, local variables, tag names, disabled points, hardware, library code, memory allocations, user privileges, audit management, timers, temperatures, molding parameters, work-in-process, inventory, backlog, through-put, cycle times, material properties, safety data, quality assurance, tracking data, customer data, or asset information. Next, the method comprises training custom query engine 112 of industrial process control system 100 based on the training dataset and managing the system data stored in the data tables with the monitoring system. In the illustrated embodiment, the training set comprises compiling alarm priority data and further comprising managing the alarm priority data stored in the data tables with the monitoring system (FIGS. 8-11). Next, the method comprises generating one or more models for matching query terms to the system data in the data tables with custom query engine 112. The method then comprises receiving, from user 118, input data representative of the system data that the user intends to access in the data tables for generating a custom query. Then, the method comprises executing the one or more custom queries on the one or more data tables. Next, the method comprises outputting an output of best fit multiple custom queries executed, the output retrieving selected system data from the one or more data tables in response to the custom queries. Next, the method comprises generating a visualization, the visualization displaying information representative of the results of the executed custom query. The visualization may be configured as a visualization software application display or an interactive bot (i.e., bot driven interaction). The visualization is generated using a predefined template selected based on a context of the selected system data retrieved from the data tables. The custom query engine 112 comprises a (ML/AI) algorithm for auto-generating the custom queries and contextual analytics. Finally, the method comprises retraining/ evolving the custom query engine based on new contextual data to make the trained system more generalized. In one embodiment of the present disclosure, the method still further comprising generating one or more domain models using the system data received from the sources (FIG. 5). The domain models are a function of, for example, schema, data, context, usage, relevance, and/or other relevant attributes. The custom query engine 112 is further configured to score the usage of the domain models in order to determine the frequency with which domain models are utilized. The scoring is utilized in generating the custom queries, contextual analytics, and/or the visualization. This information is further used by custom query engine 112 to execute the contextual analytics and auto-generate custom queries.

Figure 2:
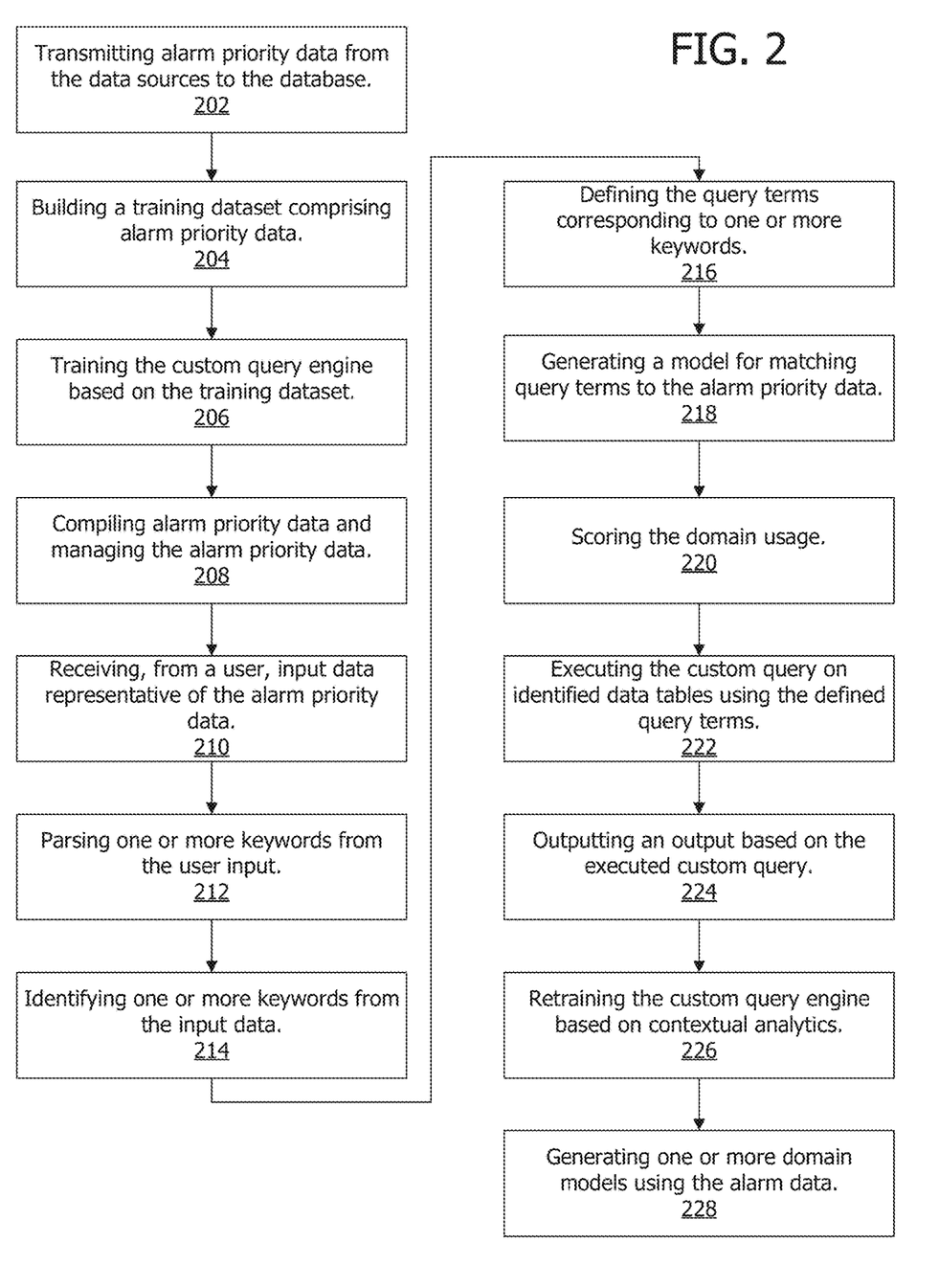
FIG. 2 is a flow diagram illustrating a computer-implemented method for generating custom queries.
Figure 3:
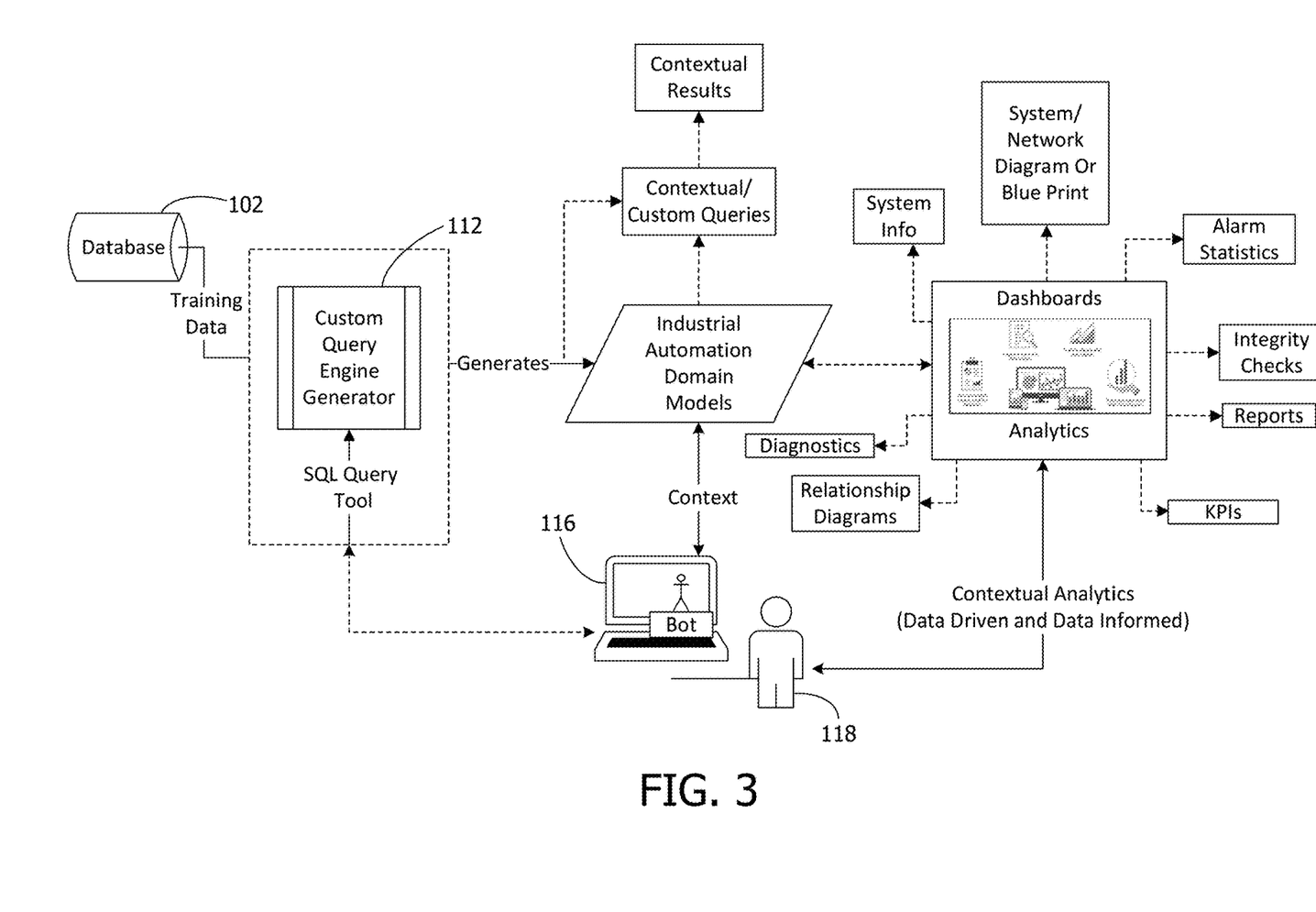
FIG. 3 is a schematic of a computer-implemented method for generating custom queries and associated analytics for the given user context or custom query.
Figure 4:
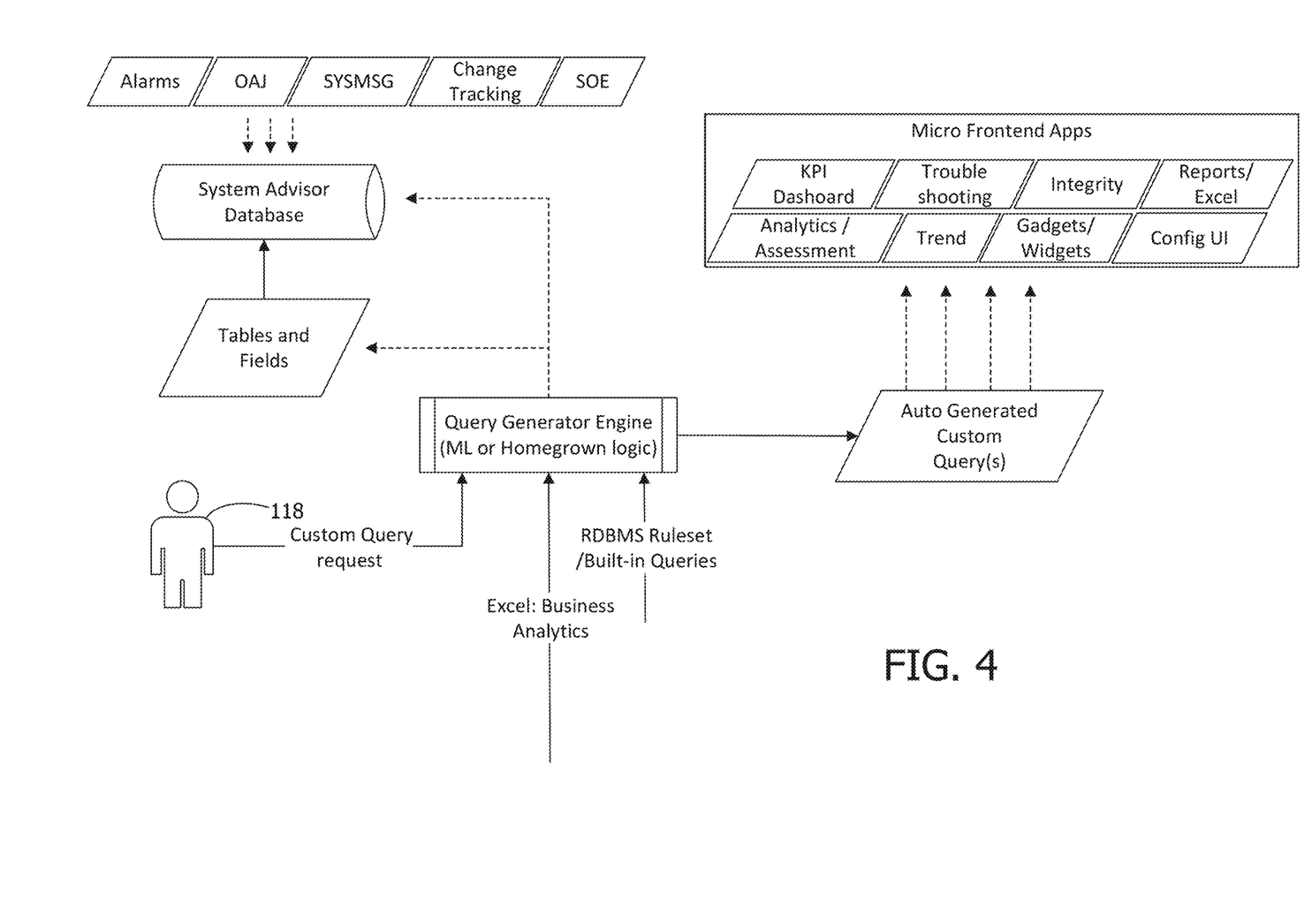
FIG. 4 is schematic of a portion of the computer-implemented method for generating custom queries.

In the specific example of FIG. 2, operations begin at 202 by transmitting alarm priority data from sources 104 to database 102. The flowchart considers alarms as an exemplary scenario of one of the domain/categories monitored by the system. A training dataset comprising alarm priority data is built at 204 for training custom query engine 112 at 206. Alarm priority data is compiled and managed at 208. In response to receiving input data representative of the alarm priority data from user 118 at 210, processor 106 executes routines for parsing one or more keywords from the user input at 212, identifying one or more keywords from the input data at 214, and defining the query terms corresponding to one or more keywords at 216. Proceeding to 218, processor 106 generates a domain model for matching query terms to the alarm priority data. The method next comprises at step 220 scoring the domain usage once the models are generated at step 218. Using the scoring of the domain usage, the processor 106 then executes the custom query on identified data tables using the defined query terms and user given context at 222 and outputs an output based on the executed custom query at 224. Retraining custom query engine 112 based on contextual analytics occurs at 226. Moreover, processor 106 generates one or more domain models using the alarm data at 228.

Figure 8:
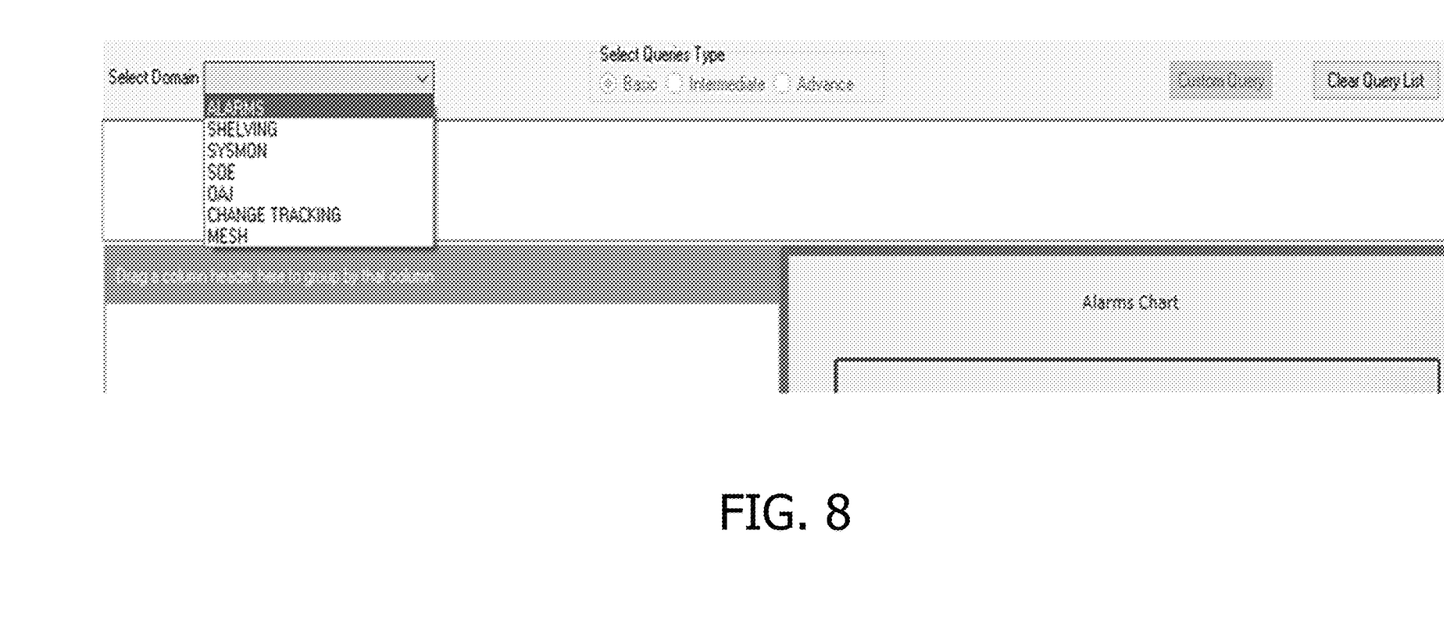
FIG. 8 is an example user interface of the computer-implemented method for generating custom queries
Figure 9:
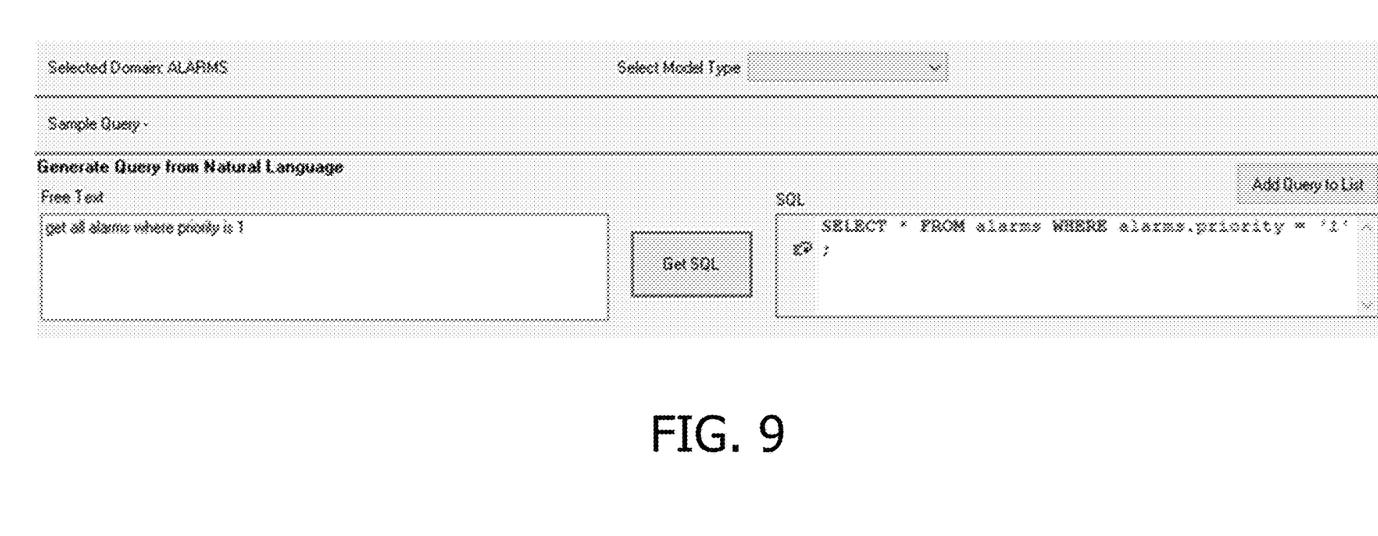
FIG. 9 is an example user interface of the computer-implemented method for generating custom queries with a custom query being generated.
Figure 10:
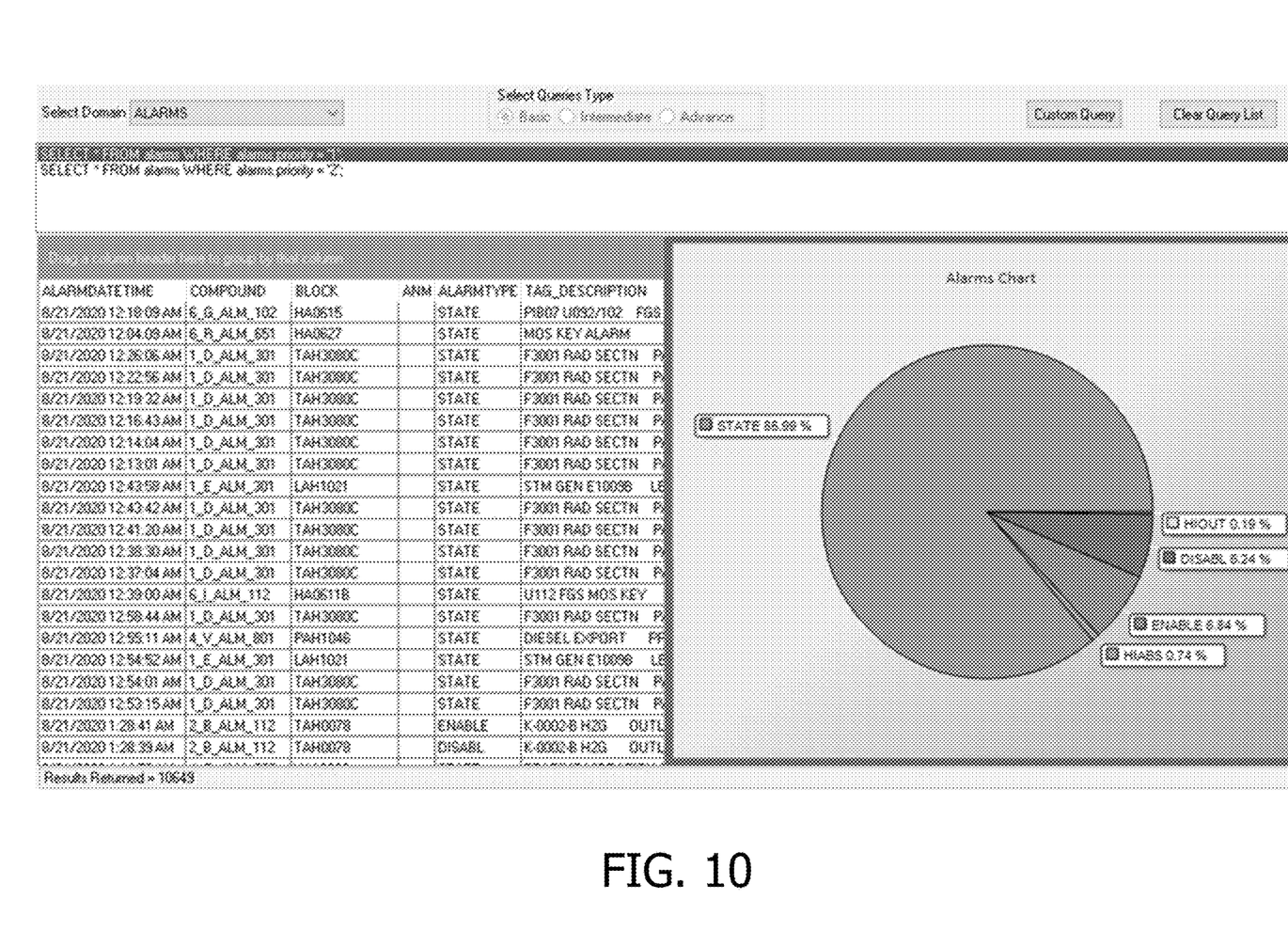
FIGS. 10 and 11 are example screenshots displaying visualization produced by a computer-implemented method for generating custom queries.
Figure 11:
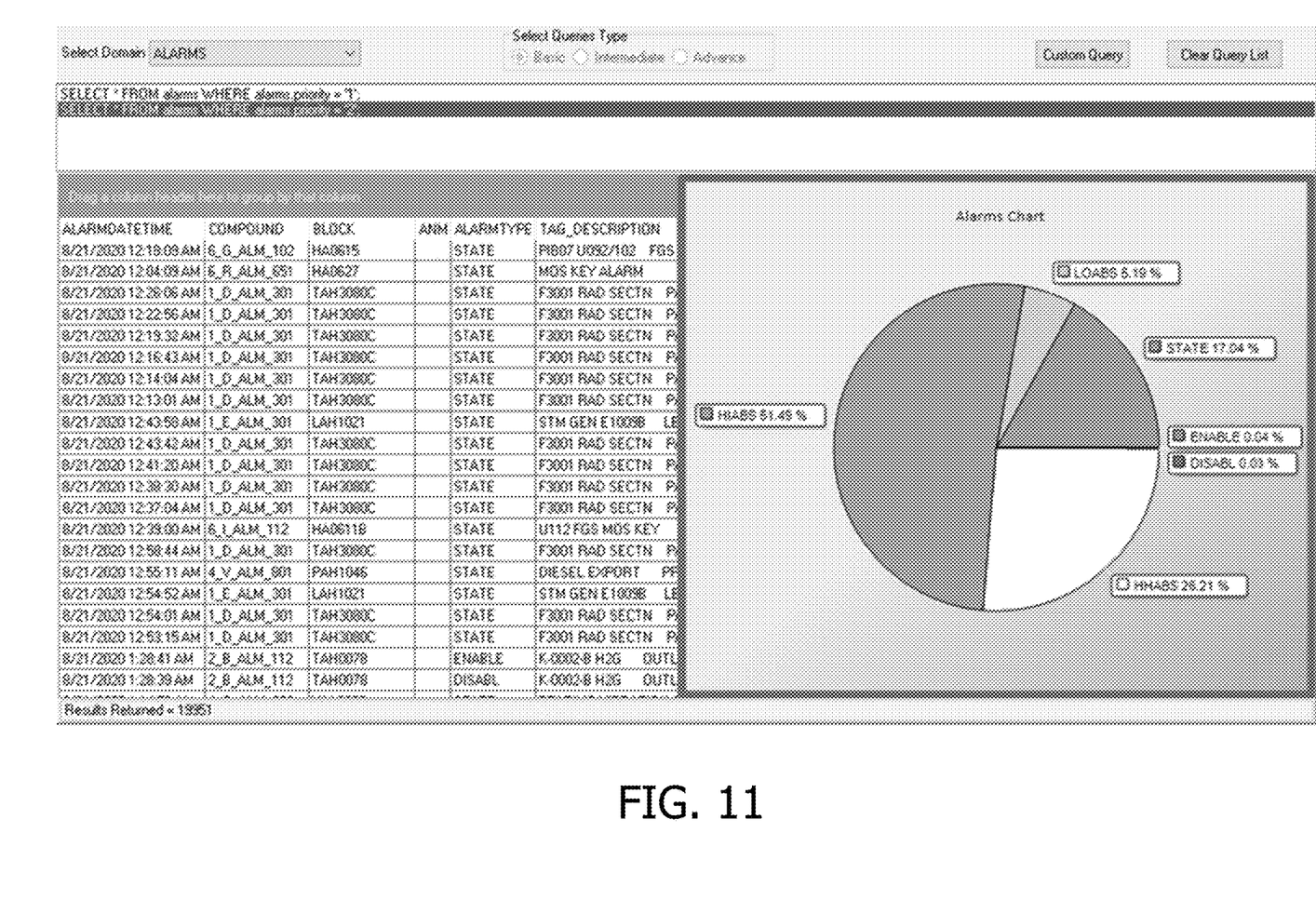

Referring to FIGS. 8-11, an exemplary embodiment of disclosure is shown. In the exemplary embodiment, the "ALARMS" domain is selected by user 118 using display 116 (FIG. 8). The user 118 then inputs in a "free text" box the information the user wishes to extract from the system. This constitutes the user input described above. When the user selects the "Get SQL" button, custom query engine 112 parses the keywords and matches the keywords to the query terms (FIG. 9). By matching the keywords to the query terms generated by custom query engine 112, the custom query engine is able to identify the data tables associated with the keywords. The custom query engine 112 can then executes the custom query, outputting an output based on the executed custom query. Additionally, the exemplary embodiment includes an "Add Query to List" button, the button being used to save the custom query created by user 118 for quick use in the future. FIGS. 10 and 11 further show the contextual analytics and outputs based on the custom query visualization being displayed for user 118 on display 116. These interfaces are also capable of being generated using an interactive bot.

The situations in which the custom query engine with contextual analytics can be effective include, but are not limited to: 1) for weekly report on "Alarm floods>20 alarm rate in 10 minutes", 2) weekly reports for "Most Frequent Alarms with Threshold Limit Alarm 50 Count", 3) percentage contribution of top ten most frequent alarms to the overall alarm load, 4) priority information to give low priority alarms KPI, 5) update Master Alarm Database (MADB) for each control system block or compound, 6) comparison of the MADB set points limits against the block ranges, 7) for monthly "alarms per week period, with threshold limit 50", or 8) for a controller modes report along with the tag details for <7 days and >7 days. The result of custom query engine 112 in industrial process control system 100 is a reduction or elimination of the need for manual analysis by creating self servicing analytics, including flexibility in the hands of customers to perform analysis and assessment of data without burdening developers. Data driven decision making through Apps, which are extendable to customer needs, are also allowed by custom query engine 112. Additionally, continuously evolving intelligence in the system to generate refined/variant custom queries is possible.

The implementation of this technology will make it easy for customers to create queries regarding performance measurements and business intelligence without the dependency on R&D teams, as GCS and delivery/service teams will now have built-in solutions to address the specific needs of customers. A single solution, with readily available data mapped Apps for on the fly user-created custom queries, avoids the user needing to consolidate the "knowledge/information" from multiple interfaces of the industrial process control system (i.e., from system advisory software). The solution offers visualization of customer requirements/use cases with the availability of evolving custom queries knowledge base. Improved efficiency and driving towards reduced engineering efforts generates business intelligence for better decision making. Thus, the "out of box" solution can extend to any other products using an industrial process control systems having RDBMS driven intelligence or from similar sources like excel.

In an alternative embodiment of the present disclosure, a method of scoring domain model usage will now be described. The method comprises building a training dataset from sources 104, the training dataset comprising one or more data tables, the data tables storing system data representative of status of one or more domain parameters or categories of an industrial process. These parameters include, but are not limited to, key performance indicator templates, alarms, input/output, local variables, tag names, disabled points, hardware, library code, memory allocations, user privileges, audit management, timers, temperatures, molding parameters, work-in-process, inventory, backlog, through-put, cycle times, material properties, safety data, quality assurance, tracking data, customer data, or asset information. Next, the method comprises training custom query engine 112 of industrial process control system 100 based on the training dataset. In one embodiment, the training set comprises compiling alarm priority data and further comprising managing the alarm priority data stored in the domains with the monitoring system 100. The method further comprises receiving, from user 118, input data representative of the system data that the user intends to access in the domains for generating a custom query and parsing, by custom query engine 112, one or more keywords from the input data. Next, the method comprises identifying, by custom query engine 112, one or more of the domains associated with the keywords and defining the query terms corresponding to the one or more keywords. Next, the method comprises separating the system data in the data tables into a plurality of domains and generating a model for matching query terms to the system data in the data tables with custom query engine 112. The domains are a function of one or more of the following: schema, data, context, usage, or relevance. Further, the method comprises scoring the usage of the domains overtime and generating the associated contextual analytics (data informed and data driven), and a dashboard for the given user input (i.e., the custom query). The scoring of the usage of the domains overtime is more particularly pointed out in FIG. 6. The method then comprises executing the custom query on the identified one or more domains using the defined query terms and outputting an output based on the executed custom query, the output retrieving selected system data from the data tables in response to the custom query. The solution comes up with a predefined template (i.e., a dashboard, analytical template, or report) based on the custom query provided to the custom query engine. The custom query engine 112 is further comprised of a (ML/AI) algorithm for auto-generating the custom queries and performing contextual analytics.

Embodiments of the present disclosure may comprise a special purpose computer including a variety of computer hardware, as described in greater detail below.

For purposes of illustration, programs and other executable program components may be shown as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What I claim is:

1. A computer-implemented method for monitoring an industrial process, the method comprising:
    building a training dataset from system data stored in a plurality of data tables associated with the industrial process, the system data organized in a plurality of domains and representative of status of one or more domain parameters of the industrial process;
    training a custom query engine based on the training dataset;
    generating one or more domain models using the trained custom query engine, the domain models matching query terms to the system data stored in the plurality of data tables associated with the industrial process;
    receiving, from a user, input representative of the system data that the user intends to access in the domains;
    executing at least one of the domain models based on the input from the user to generate one or more custom queries;
    executing the one or more custom queries on the data tables to access selected system data;
    generating an output of the one or more custom queries, the output retrieving the selected system data from the data tables in response to executing the one or more custom queries;
    generating a visualization of the output based on contextual data relating to the selected system data retrieved from the data tables, the contextual data being a function of frequency of usage of the domains and custom query results for the user input; and
    retraining the custom query engine based on the contextual data.

2. A method as set forth in claim 1, wherein the generating a visualization of the output comprises applying a predefined template for the selected system data using visualization software applications through bot-driven interaction applications.

3. The method as set forth in claim 1, wherein the custom query engine comprises a machine learning algorithm for auto-generating the custom queries and contextual data.

4. The method as set forth in claim 1, further comprising:
    parsing, by the custom query engine, one or more keywords from the input,
    identifying, by the custom query engine, one or more of the data tables associated with the keywords, and
    defining, by the custom query engine, query terms corresponding to the one or more keywords.

5. The method as set forth in claim 4, further comprising using contextual data to analyze the output and the custom queries and re-training the custom query engine as a function thereof.

6. The method as set forth in claim 5, wherein the domain models are a function of one or more of the following: schema, data, context, usage, and relevance.

7. The method as set forth in claim 6, wherein the custom query engine scores the usage of the domain models to generate custom queries and contextual data.

8. The method as set forth in claim 1, the method further comprising generating one or more domain models using the system data received from the sources.

9. The method as set forth in claim 1, wherein building the training set comprises compiling the system data and further comprising managing the system data stored in the data tables with the monitoring system.

10. The method as set forth in claim 1, wherein the parameters of the industrial process comprise one or more of the following: key performance indicator templates, alarms, input/output, local variables, tag names, disabled points, hardware, library code, memory allocations, user privileges, audit management, timers, temperatures, molding parameters, work-in-process, inventory, backlog, through-put, cycle times, material properties, safety data, quality assurance, tracking data, customer data, and asset information.

11. An industrial process control system comprising:
- a database containing system data in one or more data tables, the system data organized in a plurality of domains and representative of status of one or more domain parameters of an industrial process;
- one or more processors;
- a memory configured to store one or more processor-executable instructions, the processor-executable instructions including a machine learning custom query engine; and
- a display configured to accept input from a system user;
- wherein the machine learning custom query engine, when executed by the one or more processors, is configured to perform operations, the operations comprising:
- building a training dataset and generating the domains from the system data;
- training the custom query engine based on the training dataset,
- generating one or more domain models using the trained custom query engine, the domain models matching query terms to the system data stored in the data tables associated with the industrial process;
- receiving, from the system user, input representative of the system data that the system user intends to access in the domains;
- executing at least one of the domain models based on the input from the system user to generate one or more custom queries;
- executing the one or more custom queries on the data tables to access selected system data;
- generating an output of the one or more custom queries, the output retrieving the selected system data from the data tables in response to executing the one or more custom queries; and
- displaying a visualization of the output based on contextual data relating to the selected system data retrieved from the data tables, the contextual data being a function of frequency of usage of the domains and custom query results for the user input.

12. The industrial process control system as set forth in claim 11, wherein the visualization is generated using a predefined template.

13. The industrial process control system as set forth in claim 12, wherein the custom query engine generates contextual data based on domain usage frequency.

14. The industrial process control system as set forth in claim 13, wherein the operations further comprise:
- parsing, by the custom query engine, one or more keywords from the input,
- identifying, by the custom query engine, one or more of the data tables associated with the keywords, and
- defining, by the custom query engine, the query terms corresponding to the one or more keywords.

15. The industrial process control system as set forth in claim 14, wherein the custom query engine scores the frequency of usage of the domain models to generate custom queries and contextual data.

16. The industrial process control system as set forth in the claim 12, wherein the contextual data are derived from the type of data that results from the one or more custom queries, and wherein the predefined template is selected based on at least one of the contextual data and a bot-driven interaction application.

17. The industrial process control system as set forth in claim 11, wherein the machine-learning custom query engine generates contextual data of a process using the system data, input data, and processor executable instructions.

18. The industrial process control system as set forth in claim 11, wherein the domain models are a function of one or more of the following: schema, data, context, usage, and relevance.

19. The industrial process control system as set forth in claim 11, wherein building the training set comprises compiling the system data and wherein the operations further comprise managing the system data stored in the data tables with the control system.

20. The industrial process control system as set forth in claim 11, wherein the parameters of the industrial process comprise one or more of the following: key performance indicator templates, alarms, input/output, local variables, tag names, disabled points, hardware, library code, memory allocations, user privileges, audit management, timers, temperatures, molding parameters, work-in-process, inventory, backlog, through-put, cycle times, material properties, safety data, quality assurance, tracking data, customer data, and asset information.

21. A method of scoring domain model usage, the method comprising:
- building a training dataset from system data stored in a plurality of data tables associated with an industrial process, the training dataset comprising one or more data tables, the system data organized in a plurality of domains and representative of status of one or more domain parameters of the industrial process, wherein building the training set comprises compiling the system data and further comprising managing the system data stored in the domains with the monitoring system;
- training a custom query engine of an industrial process control system based on the training dataset, wherein the custom query engine comprises a machine learning algorithm for auto-generating custom queries and contextual data;
- separating the system data in the data tables into the plurality of domains, wherein the domains are each a function of one or more of the following: schema, data, context, usage, and relevance, and wherein separating the system data in the data tables into the plurality of domains comprises generating one or more domain models using the system data received from the sources;
- generating a model for matching query terms to the system data in the data tables with the custom query engine;
- receiving, from a user, an input representative of the system data that the user intends to access in the domains, for generating a custom query;
- parsing, by the custom query engine, one or more keywords from the input data;
- identifying, by the custom query engine, one or more of the domains associated with the keywords;
- defining, by the custom query engine, the query terms corresponding to the one or more keywords;

executing the custom query on the identified one or more domains using the defined query terms;
outputting an output based on the executed custom query, the output retrieving selected system data from the data tables in response to the custom query;
scoring the usage of the domains over time; and
generating the associated contextual data and a dashboard for the given user input.

\* \* \* \* \*